(12) United States Patent
Schat

(10) Patent No.: US 11,693,966 B2
(45) Date of Patent: Jul. 4, 2023

(54) SYSTEM AND METHOD FOR TRIGGERING AND DETECTING HARDWARE TROJANS

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 236 days.

(21) Appl. No.: 16/540,904

(22) Filed: Aug. 14, 2019

(65) Prior Publication Data

US 2021/0049266 A1 Feb. 18, 2021

(51) Int. Cl.
*G06F 21/56* (2013.01)
*G06F 21/55* (2013.01)
*G01R 31/317* (2006.01)

(52) U.S. Cl.
CPC .......... *G06F 21/567* (2013.01); *G06F 21/552* (2013.01); *G06F 21/554* (2013.01); *G06F 21/566* (2013.01); *G01R 31/31724* (2013.01); *G06F 2221/034* (2013.01)

(58) Field of Classification Search
CPC .... G06F 21/567; G06F 21/552; G06F 21/554; G06F 21/566; G06F 2221/034; G01R 31/31724
See application file for complete search history.

(56) References Cited

U.S. PATENT DOCUMENTS

| | | | | |
|---|---|---|---|---|
| 4,697,183 A * | 9/1987 | Jenning | ................. | G06K 7/0008 324/233 |
| 11,188,683 B2 * | 11/2021 | Edwards | ................. | G06F 21/76 |
| 2008/0114562 A1 * | 5/2008 | Sul | ................. | H04L 1/245 702/122 |
| 2012/0043991 A1 * | 2/2012 | Lin | ................. | G01R 31/318575 326/16 |
| 2012/0278893 A1 * | 11/2012 | Jyothi | ................. | G06F 21/71 726/24 |
| 2013/0019324 A1 * | 1/2013 | Tehranipoor | ............. | G09C 1/00 726/34 |
| 2013/0127442 A1 * | 5/2013 | Satoh | ................. | G06F 21/44 324/76.77 |

(Continued)

OTHER PUBLICATIONS

Sivasankaran, et al. "Optimized Secure Scan Flip Flop to Thwart Side Channel Attack in Crypto-Chip". International Conference on Advances of Science and Technology. Springer, Cham, 2018. (Year: 2018).*

(Continued)

*Primary Examiner* — Chau Le
*Assistant Examiner* — Zhe Liu

(57) ABSTRACT

A method for managing operation of a circuit includes activating a trigger engine, receiving signals from a target circuit, and detecting a hardware trojan based on the signals. The trigger engine may generate a stimulus to activate the hardware trojan, and the target circuit may generate the received signals when the stimulus is generated. The trigger engine may be a scan chain which performs a circular scan by shifting bit values through a series of flip-flops including a feedback path. The target circuit may be various types of circuits, including but not limited to a high-speed input/output interface. The hardware trojan may be detected based on bit-error rate information corresponding to the signals output from the target circuit.

16 Claims, 9 Drawing Sheets

(56) References Cited

U.S. PATENT DOCUMENTS

| | | | | |
|---|---|---|---|---|
| 2015/0358337 | A1* | 12/2015 | Keller | H04W 12/128 726/23 |
| 2016/0061894 | A1* | 3/2016 | Singh | G01R 31/31725 324/750.3 |
| 2016/0098561 | A1* | 4/2016 | Keller | G06F 21/554 726/24 |
| 2016/0124045 | A1* | 5/2016 | Manohar | H03K 3/0315 324/617 |
| 2018/0350412 | A1* | 12/2018 | Lee | H03M 9/00 |
| 2019/0044551 | A1* | 2/2019 | Dine | H03D 7/1441 |
| 2019/0197237 | A1* | 6/2019 | Aguayo Gonzalez | G01R 21/00 |
| 2019/0347417 | A1* | 11/2019 | Tehranipoor | G06F 21/568 |
| 2020/0104497 | A1* | 4/2020 | Crouch | G06F 21/76 |
| 2021/0033669 | A1* | 2/2021 | Cheng | G01R 31/3177 |
| 2021/0342443 | A1* | 11/2021 | Prvulovic | G06F 30/398 |

OTHER PUBLICATIONS

Nguyen, et al. "Creating a backscattering side channel to enable detection of dormant hardware trojans." IEEE transactions on very large scale integration (VLSI) systems 27.7 (Jul. 2019): p. 1561-1574 (Year: 2019).*

Hély et al. "Experiences in side channel and testing based Hardware Trojan detection." 2013 IEEE 31st VLSI Test Symposium (VTS) (2013): p. 1-4 (Year: 2013).*

Li, Shiqiang, et al. 'The Design of Pseudo-random Signal Transmitting Electromagnetic Detection System Based on FPGA.' Unifying Electrical Engineering and Electronics Engineering. In Springer [online], Jun. 15, 2013, p. 1801-1809. (Year: 2013).*

Mukherjee et al., 'Design and Implementation of PRBS Generator Using VHDL'. In CORE [Online], Mar. 12, 2019. Retrieved from the Internet: <URL: https://web.archive.org/web/20190312171321/ https://core.ac.uk/download/pdf/53186864.pdf> (Year: 2019).*

Kouhanjani et al. "Improving Hardware Trojan Detection Using Scan Chain Based Ring Oscillators." Microprocessors and Microsystems vol. 63. 2018. p. 55-65 . (Year: 2018).*

Antonopoulos, A. "Security and Trust in the Analog/Mixed-Signal/ RF Domain: A Survey and a Perspective", 2017 22nd IEEE European Test Symposium (ETS), 10 pages. (Date of Conference: May 22-26, 2017).

Yang, K., et al. "A2: Analog Malicious Hardware" 2016 IEEE Symposium on Security and Privacy, pp. 18-37. (2016).

Trust Hub Trojan Benchmarks, 3 pages. (Downloaded Aug. 18, 2019). http://www.trust-hub.org/benchmarks/trojan.

Tseng, Tien-Hung, et al. "Workload-Aware Lifetime Trojan based on Statistical Aging Manipulation", 2017 IEEE Conference on Dependable and Secure Computing , pp. 159-165. (Date of Conference: Aug. 7-10, 2017).

U.S. Appl. No. 15/950,207; Inventor, Jan-Peter Schat, "Method for Triggering and Detecting a Malicious Circuit in an Integrated Circuit Device", filed Apr. 11, 2018.

U.S. Appl. No. 16/009,836; Inventor, Jan-Peter Schat, Apparatuses and Methods Involving Self-Testing Voltage Regulation Circuits, filed Jun. 15, 2018.

Wang, Qianaqian, et al. "Transparent side channel trigger mechanism on analog circuits with PAAST hardware Trojans", 2018 IEEE International Symposium on Circuits and Systems (ISCAS), 4 pages. (Date of Conference: May 27-30, 2018).

\* cited by examiner

SYSTEM AND METHOD FOR TRIGGERING AND DETECTING HARDWARE TROJANS

TECHNICAL FIELD

Example embodiments disclosed herein relate generally to managing circuit operation.

BACKGROUND

A hardware trojan is a malicious modification of a circuit, often implemented in an Integrated Circuit (IC) chip or other type of semiconductor device. These trojans operate in various ways. Some trojans capture and transmit secret data (e.g., passwords, encryption keys, etc.) to unauthorized entities. Other trojans increase the aging of a host circuit for the purpose of shortening its useful life. Still other trojans disable or destroy the host circuit. Like their software counterparts, hardware trojans threaten the privacy or financial interests of the entities and end users who unknowingly use them.

Many hardware trojans are added to the interface circuits of an integrated circuit chip. For example, a High-Speed Input/Output (HSIO) trojan blocks the functioning of a chip or leaks secret keys. This may be accomplished by slightly modifying output signals transmitted through their normal channels or by diverting output signals through a maliciously provided side channel. In this latter case, the HSIO trojan may modify the current consumption of the chip in a measurable way that can be used as a basis for allowing an attacker gain access to secret data.

Many hardware trojans are activated only after the passage of a period of time, e.g., after a predetermined run time of the host circuit. This activation delay enables them to escape discovery during production testing or otherwise makes them hard to detect.

SUMMARY

A brief summary of various example embodiments is presented below. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

In accordance with one or more embodiments, a detector includes a memory configured to store instructions and control logic configured to execute the instructions to activate a trigger engine and detect a hardware trojan based on output signals of a target circuit. The trigger engine is configured to generate a stimulus that activates the hardware trojan, and the output signals of the target circuit are generated when the stimulus is applied. The trigger engine may include a scan chain of flip-flops and the scan chain may be configured to perform a circular scan that includes shifting bit values through the flip-flops to generate the stimulus. The control logic may be configured to control the scan chain to perform the circular scan a predetermined number of cycles to generate the stimulus. The stimulus may include electromagnetic energy generated based on shifting the bit values through the flip-flops.

The target circuit may include a high-speed input/output (HSIO) interface which includes the hardware trojan. The control logic may be configured to activate the trigger engine during a built-in self-test (BIST) of the HSIO interface and process the output signals of the target circuit to detect the hardware trojan in the HSIO interface during the BIST. The control logic may be configured to detect the hardware trojan based on bit-error rate information corresponding to the output signals of the target circuit. The control logic may be configured to detect the hardware trojan based on a difference between a first bit-error rate and a second bit-error rate, the first bit-error rate generated when the stimulus is not applied to the target circuit by the trigger engine and the second bit-error rate generated when the stimulus is applied to the target circuit by the trigger engine.

The hardware trojan may be a type which is configured to perform at least one of the following: send secret data to an unauthorized entity, disrupt operation of the target circuit or its host circuit; destroy operation of the target circuit or its host circuit; corrupt data of a data stream managed by the target circuit or its host circuit; and impair the target circuit or its host circuit on an intermittent basis. The memory, control logic, trigger engine, and target circuit may be in a same host circuit.

In accordance with one or more other embodiments, a method for managing operation of a circuit includes activating a trigger engine; receiving signals from a target circuit; and detecting a hardware trojan based on the signals. The trigger engine generates a stimulus to activate the hardware trojan, and the target circuit generates the received signals when the stimulus is generated. The trigger engine may include a scan chain of flip-flops and activating the trigger engine may include controlling the scan chain to perform a circular scan that includes shifting bits through the flip-flops to generate the stimulus. The circular scan may include shifting the bits through the flip-flops for a predetermined number of cycles to generate the stimulus. The stimulus may include electromagnetic energy generated based on shifting the bit values through the flip-flops. In one embodiment, the bits may be ones present in the scan chain at the moment the circular scan run is started. For example, the bits may correspond to values in the flip-flops given by a previously or currently executed application. In one embodiment, in order to trigger the hardware trojan, the bit values may be random values, e.g., the bit values may be a large number of random values that, sooner or later, hit the actual trigger word or trigger sequence that activates the hardware trojan. In another embodiment, the bits may be ones of a predetermined code intended to hit the actual trigger word or trigger sequence for activating the hardware trojan.

The target circuit may include a high-speed input/output (HSIO) interface which includes the hardware trojan. The trigger engine may be activated during a built-in self-test (BIST) of the HSIO interface and wherein detecting the hardware trojan in the HSIO interface includes processing the signals from the target circuit during the BIST. The method may include determining bit-error rate information based on the signals from the target circuit, wherein the hardware trojan is detected based on bit-error rate information. The method may include determining a difference between a first bit-error rate and a second bit-error rate, wherein the first bit-error rate is generated when the stimulus is not applied to the target circuit by the trigger engine and the second bit-error rate is generated when the stimulus is applied to the target circuit by the trigger engine and wherein the hardware trojan is detected based on the difference between the first bit-error rate and the second bit-error rate.

The hardware trojan may be a type which performs at least one of the following: send secret data to an unauthorized entity, disrupt operation of the target circuit or its host circuit; destroy operation of the target circuit or its host circuit; corrupt data of a data stream managed by the target circuit or its host circuit; and impair the target circuit or its host circuit on an intermittent basis.

In accordance with one or more embodiments, a non-transitory computer-readable medium storing instructions for causing a processor to perform operations including: activating a trigger engine to generate a stimulus; receiving signals from a target circuit when the stimulus is applied; and detecting a hardware trojan based on the signals from the target circuit. The stimulus may activate the hardware trojan and the target circuit may generate the received signals when the stimulus is generated. The trigger engine may include a scan chain to perform a circular scan by shifting bit values through a series of flip-flops. The target circuit may include a high-speed input/output (HSIO) interface. The hardware trojan may be detected based on bit-error rate information corresponding to the signals from the target circuit.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

Figure 1:
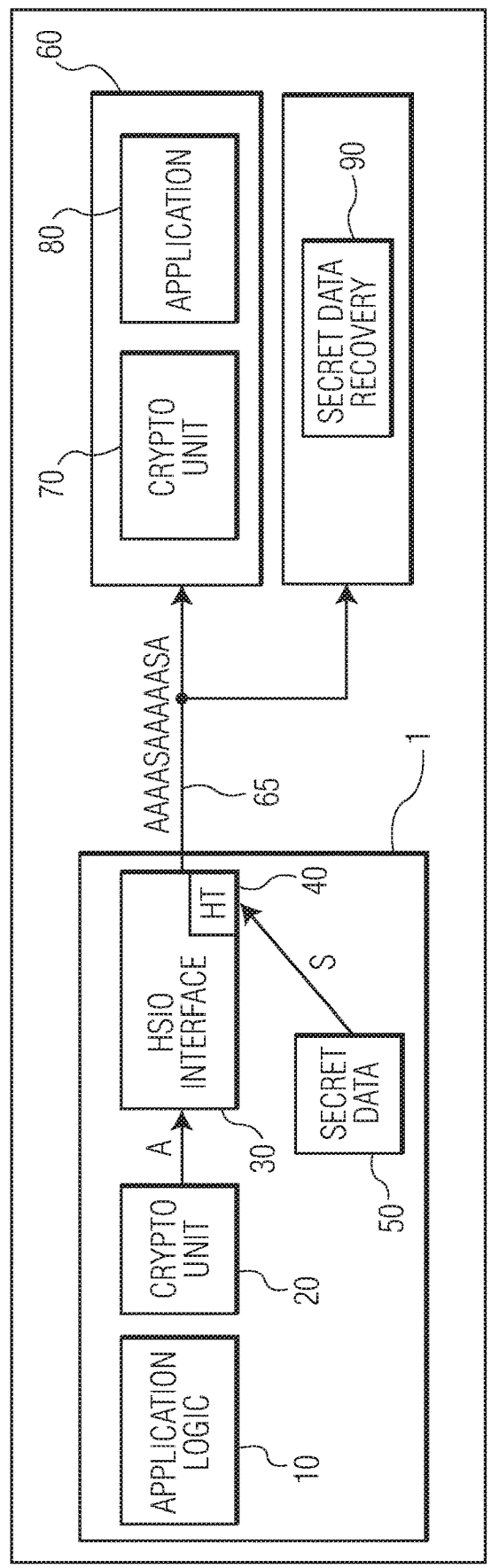
FIG. 1 illustrates an example of how a hardware trojan may operate within a host circuit.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Embodiments described herein relate to a system and method for detecting hardware trojans in a host circuit, which, for example, may be on a chip or other type of semiconductor device. The trojans may be ones that are active on a continual basis or only during one or more operational modes. In one case, the hardware trojans may be designed to become active after a predetermined period of operation (e.g., run time) of the host circuit and/or after other conditions are met. These types of hardware trojans are especially malicious because they are able to evade detection using conventional testing techniques employed during wafer or final testing which follows production, and during the validation of a small number of sample devices in a lab.

In addition to performing a detection operation, the system and method are able to trigger hardware trojans of various types. By actively triggering trojans (instead of passively waiting for them to occur), trojans may be detected before they become active and thus before the malicious attack occurs. This is especially beneficial when triggering and detecting high-speed input/output (HSIO) trojans designed to leak secret data or other confidential information the host circuit might be handling.

FIG. 1 illustrates an example scenario of how a hardware trojan may operate within a host circuit for purposes of performing a malicious attack. In this example, the host circuit 1 includes application logic 10, a module 20 storing encryption software, and an input/output interface 30 including a hardware trojan 40. In one case, module 20 may be a completely hardware-based cryptocontroller. The hardware trojan 40 is designed to access secret data 50 stored or otherwise maintained in the host circuit (or a device including the host circuit). Once accessed, the hardware trojan interleaves bits (S) of the secret data into a stream of bits (A) of application data transmitted to another device 60 over a communications link 65. The other device 60 may include a module 70 storing decryption software and a complimentary application 80. In one case, module 70 may be completely hardware-based. A malicious attacker may intercept the data stream and recover the secret data at a server, computer, or other device 90.

Figure 2:
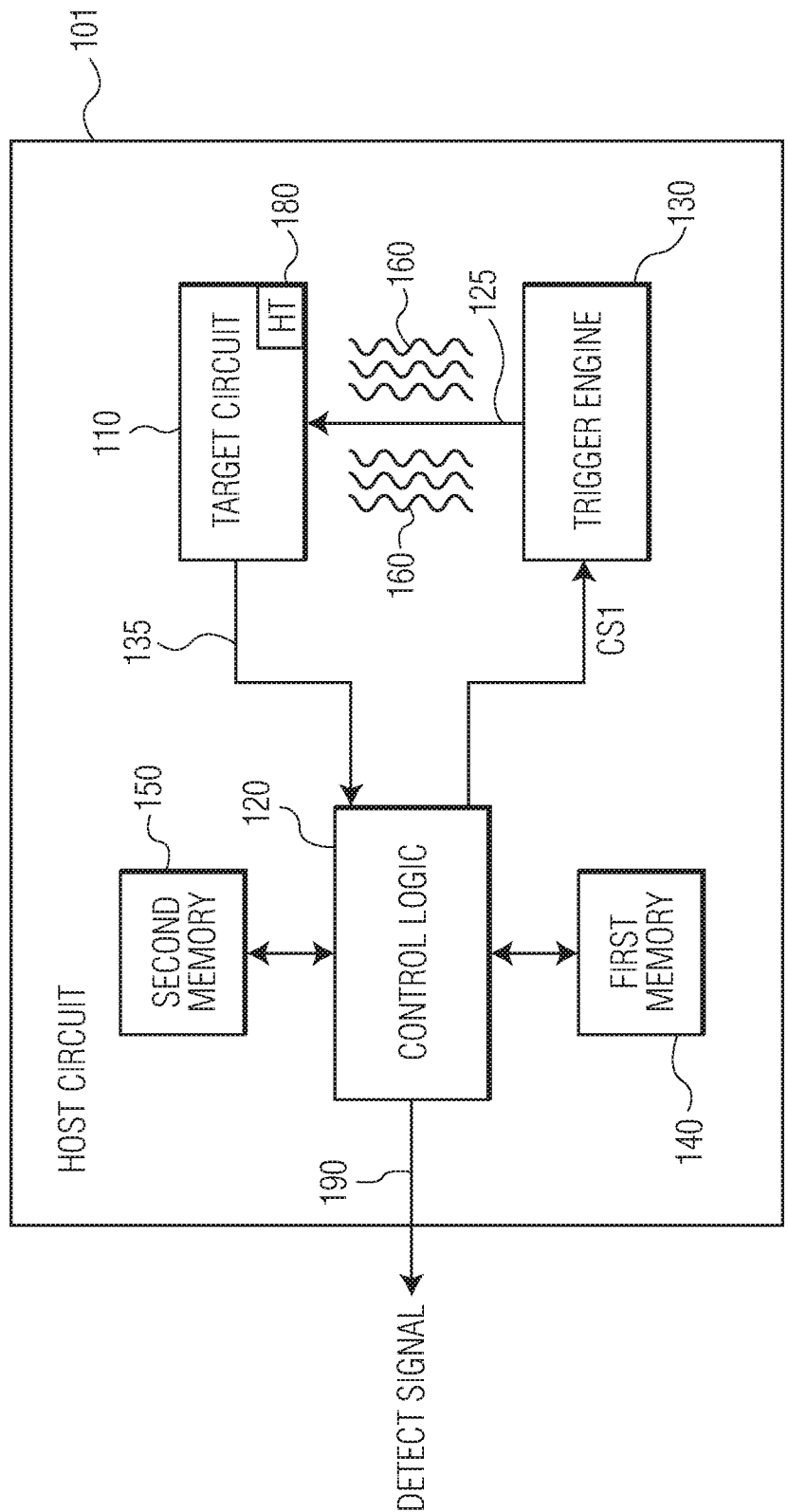
FIG. 2 illustrates an embodiment of a system for triggering and detecting a hardware trojan.

FIG. 2 illustrates an embodiment of a system for triggering and detecting a hardware trojan (HT) 180 in a host circuit 101. The host circuit may be an integrated circuit chip, a circuit formed on a printed circuit board, or another type of circuit or semiconductor device used, for example, in a computer, smart phone, tablet, workstation, server, television, and other devices of interest to a malicious attacker. For illustrative purposes, host circuit 101 is shown as an integrated circuit chip.

The hardware trojan 180 may be added to a predetermined portion of the host circuit, which is labeled target circuit 110 in FIG. 1. The trojan may be added to the target circuit, for example, by an outsourcing entity either knowingly or unknowingly. In one case, the outsourcing entity may be a chip designer or manufacturer which has taken the plans of the integrated circuit chip 101 and modified them to strategically add the trojan to the target circuit 110 in order to perform a specific type of attack. In other cases, the hardware trojan 180 may be added to the host circuit by another entity along the production or manufacturing chain.

The hardware trojan 180 may perform various types of malicious attacks. For example, the hardware trojan 180 may interfere with operation of the target circuit 110 to capture and transmit secret data (e.g., passwords, encryption keys, etc.) to unauthorized entities. This type of trojan may transmit the secret data (e.g., encryption keys, passwords, account information, identity information, login data, etc.) through a normal channel or a hidden side channel, either through a wired connection or a wireless communication link. In one case, the timing and/or power consumption of the target circuit 110 (or the host circuit 1 in general) may be modified in order to allow a side-channel attack to read out secret data. The target circuit 110 may be a high-speed input/output interface or another sub-circuit or portion of the host circuit.

In another case, the hardware trojan 180 may increase the aging of a host circuit for the purpose of shortening its useful life. In another case, the trojan may operate to disable or destroy one or more portions of the host circuit 101. For example, the trojan may operate to completely block the functioning of the host circuit pending receipt of payment, at which time the hardware trojan would be disabled to allow the host circuit to operate once again. This type of trojan has been referred to as Ransomware when implemented as software.

In another case, the hardware trojan 180 may be sporadically activated to block the functioning of the host circuit. Examples of these types of trojans include ones that intermittently reduce transmit power, add jitter or noise to provoke the occurrence of errors, flip bits in a data stream, or otherwise corrupt data using a rootcause that is hard to detect. Such trojans are used to attack smartphones and other forms of consumer electronics (usually of the same brand or type) in order to generate negative publicity and undermine consumer confidence in the manufacturer. The public reports resulting from these attacks may be even more dangerous than trojans that completely disable the host circuit.

In another case, the hardware trojan 180 may only become active during certain application modes of the host circuit or device. These modes may include ones involving the use of encryption keys, passwords, or other forms of secret data. In accordance with at least one embodiment, the system and method may trigger and detect hardware trojans that are specifically designed to operate during these so-called high-risk application modes. Although some embodiments may detect hardware trojans 180 before they have become active, other embodiments may be applied to trigger and/or detect hardware trojans 180 after they have been activated.

For hardware trojans 180 designed to become active after some hours or even years of operation, the trojan may be triggered by an analog value like temperature or device aging. Temperature can be measured, for example, based on the speed of a feedback structure. Aging can be measured, for example, based on the shift in a threshold voltage occurring after the passage of a predetermined time period, e.g., days, weeks, months, or years. Other trojans may be triggered based on one or more digital value, including but not limited to a certain pattern of digital control values to a high-speed input/output (HSIO) interface of the host circuit or a certain pattern of digital values to be transmitted or received by the HSIO interface. Other trojans may be triggered based on a combination of analog and digital triggers. In this case, for example, the hardware trojan 180 may wait until an analog condition is fulfilled (and thus sufficient time, e.g. waiting first for analog condition, like a certain number of temperature cycles), then wait for a digital condition. When both conditions are satisfied, the hardware trojan 180 may become active at least for a predetermined operational mode or time period.

Referring to FIG. 2, the system includes control logic 120 coupled to the target circuit 110 and a trigger engine 130. The control logic 120 may execute instructions stored in a first memory 140 for implementing one or more algorithms for, first, triggering a suspected hardware trojan 180 in the host circuit 101 and, second, detecting the hardware trojan once triggered.

The control logic 120 may trigger the hardware trojan 80 by sending a control signal CS1 to the trigger engine 130. The timing of the control signal may be determined, for example, based on the type of hardware trojan to be detected. In the case where the hardware trojan is already activated (e.g., on a continual basis), the triggering operation may not be needed or may be performed in order to pronounce the effects of the trojan to make it more easily detectable.

When the trojan has not yet become active or is a sporadic type that activates intermittently or based on the occurrence of a specific mode or condition, control logic 120 may output the control signal CS1 for the purpose of activating the hardware trojan 180. This active triggering approach may be performed, for example, during a period of time when the effects of the malicious attack may be nullified or mitigated or otherwise performed under controlled conditions (e.g., when all input/output circuits are disconnected from a network). In one embodiment, active triggering may be performed at some point during or immediately following the manufacturing or production process. In another embodiment, active triggering may be performed after the host circuit or device has been sold or used in the field.

The trigger engine 130 applies a stimulus to the target circuit 110 in response to the control signal CS1 from the control logic. The stimulus may take various forms depending on the type of hardware trojan suspected of being present in the host circuit. In one embodiment, the trigger engine 130 may actively trigger the hardware trojan by applying different signatures of control signals to one or more blocks of the host circuit in which the hardware trojan could be hidden. The control signals may be transmitted as a stimulus, for example, to the target circuit through one or more signal lines 125. In another embodiment, the stimulus 160 may include noise, jitter, distortion, or some other form of electromagnetic energy controlled to generate a response from and thus activate the hardware trojan. Examples of the types and timing of stimuli that may be used as a basis for triggering a hardware trojan are discussed below.

In some cases, it may be assumed that the trigger is inactive in the first seconds or minutes after power-up. The trojan may be designed in this way in order to avoid detection by any self-test mechanism that the host circuit may perform directly after power-up. The timing of the stimuli may therefore be controlled by taking these time and mode constraints into consideration. In other cases (e.g., depending on the payload), a hardware trojan may trigger only in a mode where targeted software is active or a private key has been stored and can be leaked. The timing of the stimuli may be applied during these time periods or modes to increase the likelihood of detection of such trojans. In these or other cases, application of the stimulus may be timed based on the assumption that the hardware trojan has a delayed trigger or the assumption that the trojan is already active during IC verification, validation or production testing, as well as in the validation and test phases of the target application.

Once the stimulus has been applied, target circuit 110 generates a response that is used as a basis for detecting the presence of the hardware trojan 180. The response may include, for example, output signals that are collected by the control logic 120 and optionally stored in a second memory 150. In one embodiment, the output signals 135 include a stream of bits containing errors detected by the control logic 120. The errors (e.g., bit error rate) detected at this time may deviate from a normal pattern or quantity of errors, which deviation is indicative of a hardware trojan. When this occurs, the control logic 120 may output a detect signal 190 indicating the presence of the trojan. While the control logic 120 and trigger engine 130 are located in the host circuit 1 in FIG. 1, control logic 120 and/or trigger engine 130 may be outside the host circuit (e.g., off-chip) in one or more other embodiments.

Figure 3:
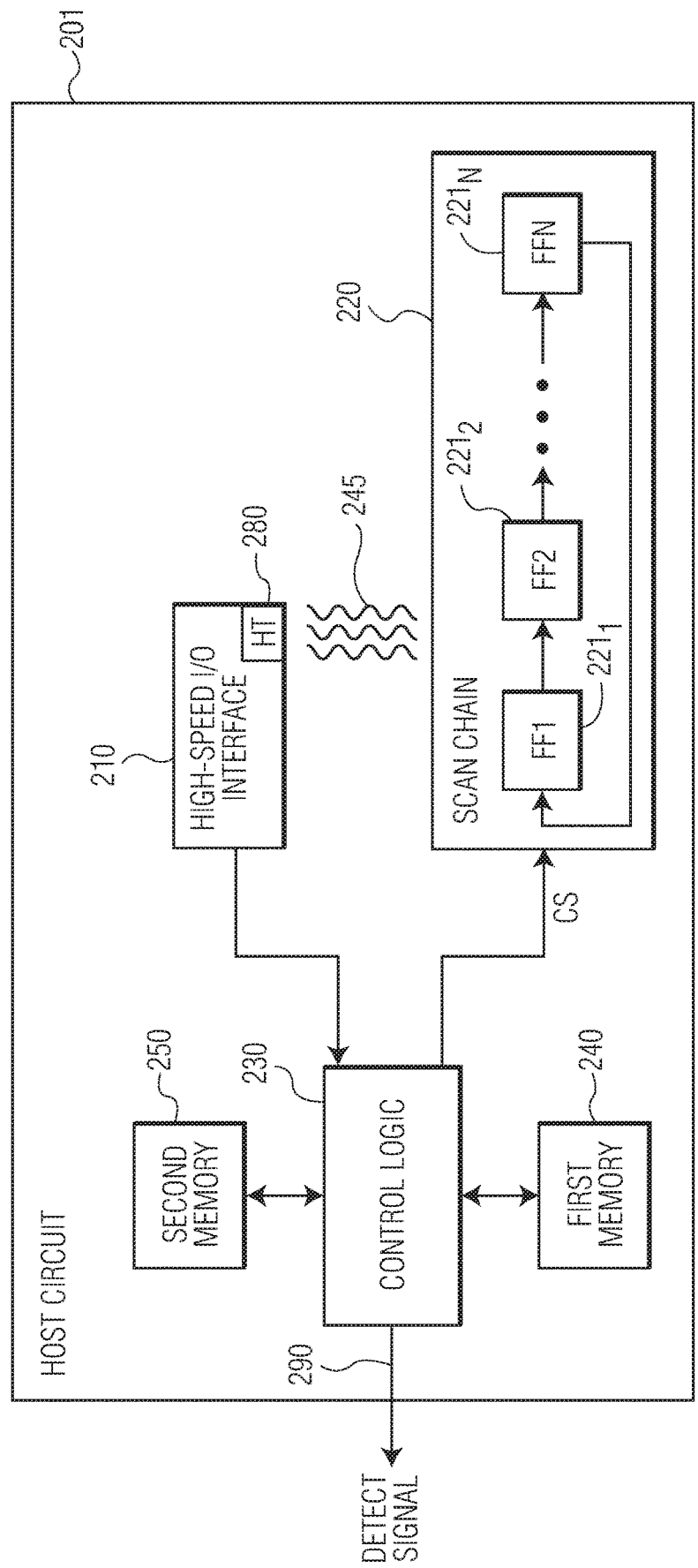
FIG. 3 illustrates an embodiment of a system for triggering and detecting a hardware trojan.

FIG. 3 illustrates an embodiment of a system for actively triggering and detecting a hardware trojan 280 in a target circuit that includes a high-speed input/output (HSIO) interface 210. In this embodiment, the trigger engine may be a scan chain 220 including a series of N flip-flops $221_1$, $221_2$, ... $221_N$ that are arranged in a circular scan pattern. The scan chain may be an existing series of flip-flops designed into the circuit to perform another purpose during production scan test or logic built-in self-test in the field, but modified for use to generate the stimulus for actively triggering the hardware trojan. Alternatively, the scan chain may be included in the host circuit (e.g., chip) 1 for the specific purpose of actively triggering hardware trojans to be detected. In this case, the scan chain may be disabled at other times.

The circular scan pattern is formed by serially linking the flip-flops, with the output of the last flip-flop $221_N$ input into the first flip-flop $221_1$ along a feedback path 222. By shifting bit values through the scan chain 220, electromagnetic energy 245 is generated that triggers activation of the hardware trojan 280 in the HSIO 210 so that it can be detected. The initial bit value may be a predetermined value for implementing a specific toggle pattern and/or frequency of the flip-flops. The specific toggle pattern and/or frequency may be programmed (e.g., into the instructions stored in the first memory) producing electromagnetic energy 245 with a particular signature for triggering activation of the hardware trojan. The particular signature may correspond, for example, to any of the conditions or operating characteristics of the trojan described herein, e.g., a predetermined noise profile, jitter profile, analog value or condition, digital value or condition, combination of analog and digital values/conditions, etc.

In one embodiment, control logic 230 may output a plurality of control signals CS (e.g., clock signals applied at a predetermined frequency) to shift the contents (bit values) of the digital scan chain 220 through one or more cycles, with the original chain content being restored at the end of each cycle. A shift cycle may be, for example, one complete revolution of the circular scan. The control logic 230 may operate based on instructions stored in first memory 240 and the output signals of the HSIO interface 210 and/or the information derived from these signals (e.g., Bit Error Rate (BER)) for detecting the hardware trojan 280 may be stored in second memory 250. The control logic may output a detect signal 290 indicating the presence or absence of a hardware trojan based on a result of processing the output signals and information from the target circuit in host circuit 201.

Figure 4A:
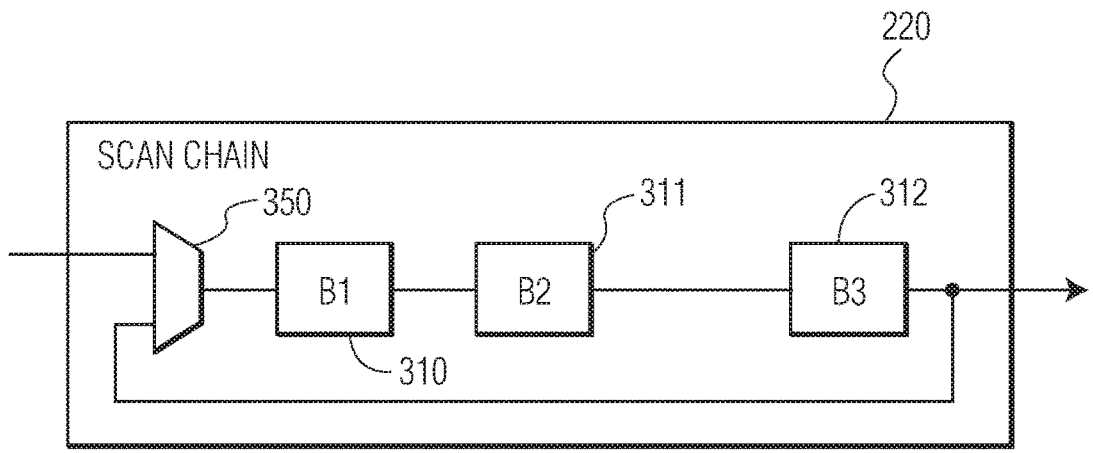
FIGS. 4A to 4C illustrate an embodiment of a trigger engine for a hardware trojan.
Figure 4B:
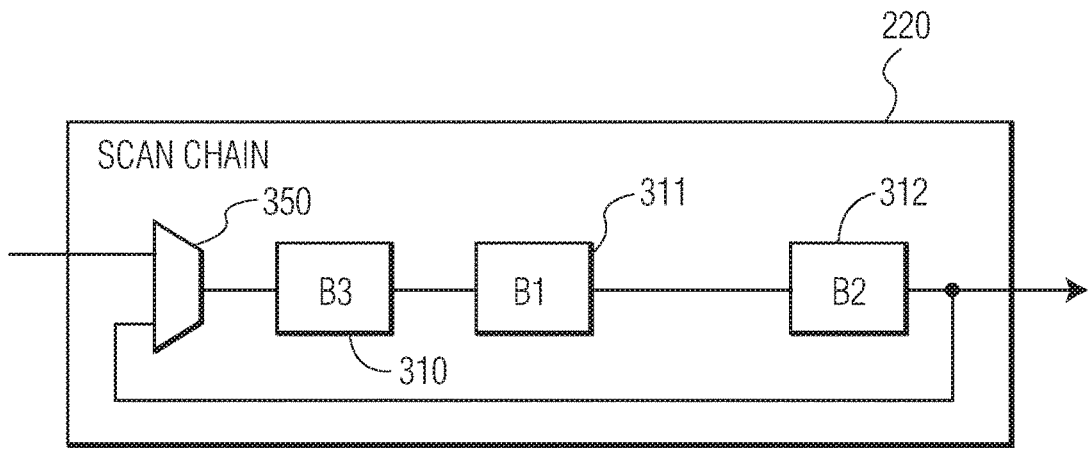
Figure 4C:
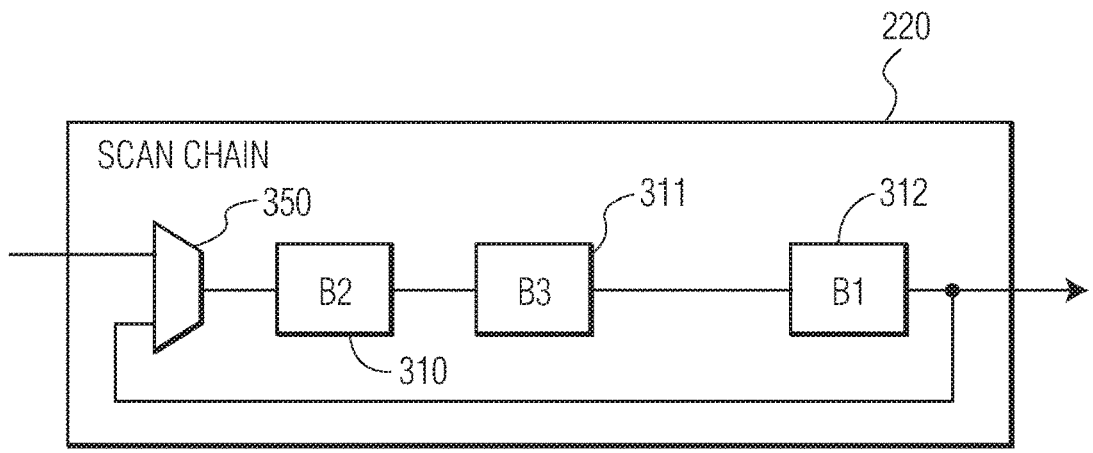

FIGS. 4A to 4C illustrate an example of how the contents of scan chain 220 may be shifted in accordance with one embodiment. In this example, the scan chain is shown to have three flip-flops (i.e., N=3) for purposes of illustration, with the understanding the scan chain 220 may have a different number of flip-flops in another embodiment.

FIG. 4A illustrates an initial state of the scan chain, where respective bit values have been loaded into the flip-flops 310, 311, and 312. In one embodiment, the bit values may correspond to a predetermined digital code. In another embodiment, the bit values may be values present in the flip-flops as a result of a previously or currently executed application. In this case, the values may be random values. Either way, the bit values may ensure that the flip-flops toggle or change state a predetermined number of times throughout the circular scan. For purposes of illustration, the bit values may correspond to a predetermined 3-*bit* digital code $B_1B_2B_3$, with each bit stored in a corresponding one of the flip-flops. That is, flip-flop 310 initially stores bit value $B_1$, flip-flop 311 initially stores bit value $B_2$, and flip-flop 312 initially stores bit value $B_3$.

FIG. 4B illustrates the bit values stored by the flip-flops after a first shift operation, which shifts the bit values in the flip-flops one position within the chain. As a result, flip-flop 310 stores bit value $B_3$ that was previously stored and shifted out of flip-flop 312. Flip-flop 311 stores bit value $B_1$ that was previously stored and shifted out of flip-flop 310. And, flip-flop 312 stores bit value $B_2$ that was previously stored and shifted out of flip-flop 311. The shifting of these bit values contributes to the formation of the electromagnetic stimulus applied to the HSIO interface 310 of the host circuit.

FIG. 4C illustrates the bit values stored by the flip-flops after a second shift operation, which shifts the bit values in the flip-flops one additional position within the chain. As a result, flip-flop 310 stores bit value $B_2$ that was previously stored and shifted out of flip-flop 312. Flip-flop 311 stores bit value $B_3$ that was previously stored and shifted out of flip-flop 310. And, flip-flop 312 stores bit value $B_1$ that was previously stored and shifted out of flip-flop 311. The shifting of these bit values also contributes to the formation of the electromagnetic stimulus applied to the HSIO interface 210 of the host circuit. One additional shift in the scan chain sets the state of the chain back to its initial position, as illustrated in FIG. 4A.

The circular scan pattern may be controlled, by control logic 230, to perform a predetermined number of cycles in order to produce a stimulus with a particular signature for triggering the hardware trojan. As previously indicated, the signature may be programmed to correspond to the specific triggering conditions and characteristics of the trojan that is suspected of being present in the host circuit. The bit values that travel along the feedback path may be input into a multiplexer 350 (or other type of selector) prior to being input into the first flip-flop. The state of the multiplexer 350 may be controlled by the control logic 230 to select the feedback path during triggering and detection of a hardware trojan. At other times (including normal operation), the state of the multiplexer 350 may be controlled by the control logic 230 to shut off the feedback path in favor of another signal path that comports with other modes of operation, e.g., normal mode.

Referring again to FIG. 3, once the electromagnetic stimulus is generated and applied to the HSIO interface 210, output signals from the interface are collected (or otherwise detected) for analysis by the control logic 230. This analysis may involve comparing these signals to one or more reference values. When the signals deviate by a predetermined amount from the reference values, the control logic 230 may be programmed to identify that a hardware trojan is present in the HSIO interface. In some embodiments, the particular type of deviation from the one or more reference values may serve as a basis for determining the type of hardware trojan that is present or at least suspected. As indicated relative to FIG. 2, the second memory may be used to store values corresponding to output values of the HSIO interface.

Figure 5:
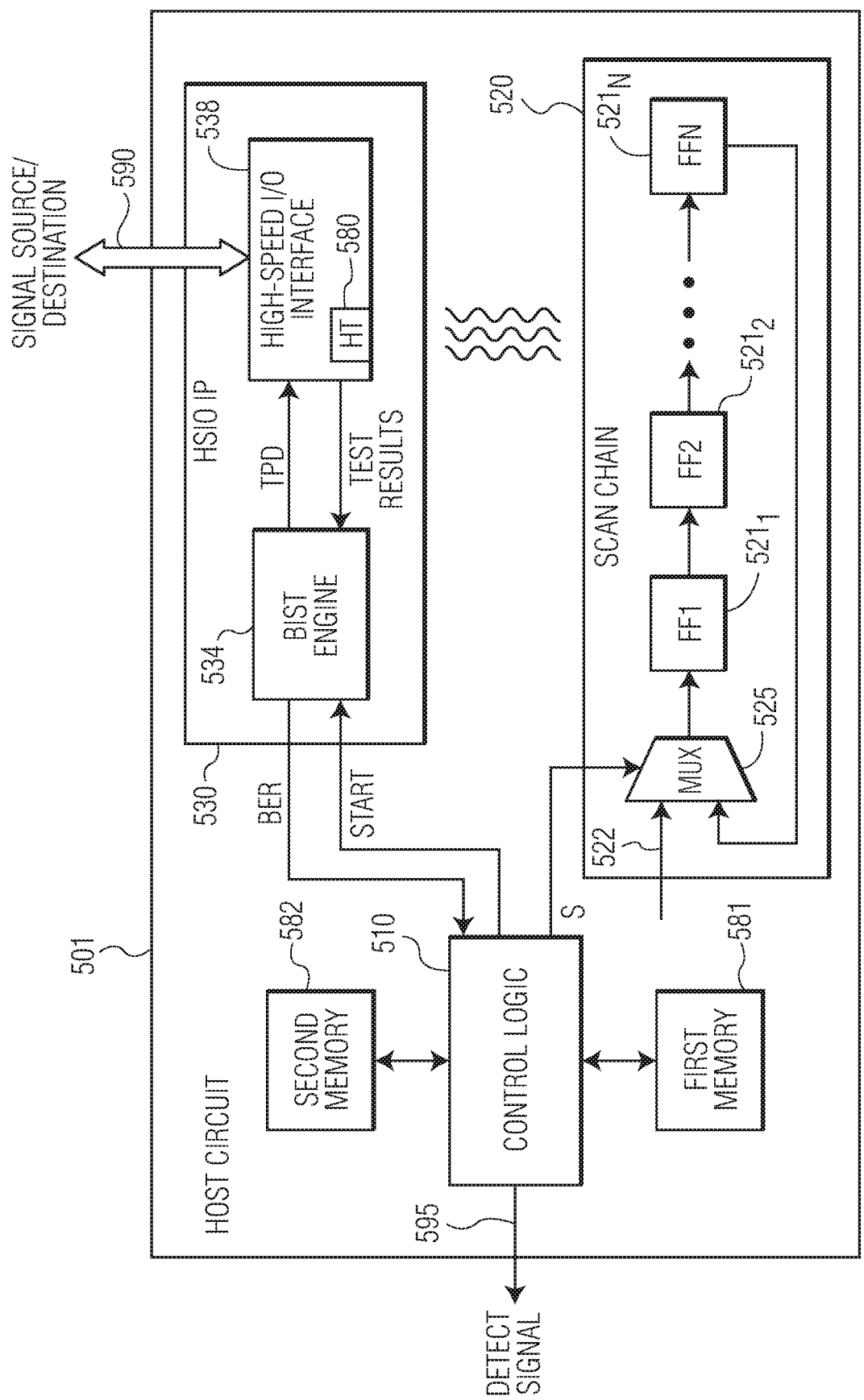
FIG. 5 illustrates an embodiment of a system for triggering and detecting a hardware trojan.

FIG. 5 illustrates another embodiment of a system for triggering and detecting a hardware trojan in a host circuit 501. In some respects, this embodiment may be considered as a more specific implementation of the embodiment of FIG. 3.

Referring to FIG. 5, the system includes control logic 510, a trigger engine which includes a scan chain 520, and an HSIO interface port 530 incorporated within a host circuit 501, which, for example, may be an integrated circuit chip used in a smart phone or other device that is designed to transmit and receive data. The control logic 510 executes instructions for controlling the scan chain 520 to apply a stimulus for actively triggering a hardware trojan 580. The hardware trojan may be designed to perform a malicious attack, which may involve, for example, accessing and transmitting secret data to an unauthorized entity. Such an example is described relative to FIG. 1 with the understanding that the system may apply in the context of different trojans in other embodiments.

The HSIO intellectual property, i.e. HSIO block (HSIO IP) 530 may communicate with a signal source or destination through a link 590. The signal source or destination may be, for example, a processor of a device (e.g., smartphone, computer, etc.) which includes the host circuit, a communications link (wired or wireless) coupled between the host circuit and another circuit or device, or some other type of signal source or destination. In this embodiment, the HSIO IP 530 is at a location adjacent to the scan chain but may be at a different location in another embodiment.

The HSIO IP 530 includes built-in self-test (BIST) engine 534 and high-speed input/output interface (HSIO) 538, the latter of which includes the hardware trojan 580. The BIST engine 534 may be programmed to run one or more predetermined tests, for example, based on instructions and test pattern data stored in at least one of the first memory 581 or the second memory 582. In one embodiment, the BIST engine 534 may include pseudo-random number generator logic, error correction logic, combinational logic, and/or other logic for purposes of confirming operation of (or the existence of defects in) the HSIO 538 based on the applied test pattern data. In one embodiment, the error correction logic may be turned off (e.g., under control of the BIST engine and/or the control logic) as the test data and stimulus are applied.

The BIST engine 534 may apply the test pattern data (TPD) to the HSIO 538 in response to a start signal input from the control logic. The start signal may be applied, for example, during production testing and/or in the field at some point after the host circuit (or the device including the host circuit) has been sold or otherwise distributed to an end user. The test pattern data may be applied by the BIST engine 534 at the same time a stimulus for actively triggering the hardware trojan 580 is applied. In order to actively trigger the hardware trojan 580, the control logic 510 may output a select signal S to select the feedback path 525 of the scan chain 520. Prior to this operation, the control logic may load an N-bit code (or N bit values that are predetermined or random) into the scan chain (for example, through signal line 522 coupled to multiplexer 525), with each bit of the code loaded into a respective one of the flip-flops $521_1$, $521_2$, ..., $521_N$ of the scan chain.

Once the code is loaded into the flip-flops of the scan chain, clock signals are applied to cause the flip-flops to toggle in order to trigger activation of the hardware trojan 580, if not already activated. In one embodiment, the clock signals may be applied (e.g., by the control logic) at a predetermined rate designed to give the best chance of triggering the hardware trojan 580. The predetermined rate may be determined, for example, based on the specific type of hardware trojan that is suspected to exist in the host circuit. Different hardware trojans may respond to different types of stimuli. Thus, the clock signal rate may fall into a range set to actively trigger the trojan. In one embodiment, the clock signal rate may be set to different rates (e.g., by the control logic) in order to change the stimulus to test for different types of hardware trojans.

In one embodiment, the stimulus and test pattern data may be simultaneously applied at a time intermittent to normal operation of the host circuit in application mode. The BIST runs for trojan detection may align with BIST runs in the field required for functional safety. Triggering the hardware trojan during BIST in the field may, for example, involve shifting the contents of the scan chains, similar to the scan shift-in/shift-out of flip-flop values used in a production test. Shifting the scan chains would normally destroy the original contents of the flip-flops. However, the scan chain of one or more embodiments includes an added feedback path which feeds the shifted bits of the code back into the input of that scan chain. Thus, with N flip-flops in the scan chain, the original contents of the flip-flops may be restored after N clock cycles.

The N-bit code may be shifted thru the flip-flops of the scan chain a predetermined number of times, e.g., one or more, in order to trigger the hardware trojan. The number of times the shift occurs may be based, for example, on the instructions corresponding to the algorithm being executed by the control logic. In one embodiment, each time a shift in the circular scan is performed, the initial value of the scan flip-flops may be different. Hence, whatever code is used to generate the stimulus for actively triggering the hardware trojan may be applied in one of the many circular scan runs performed in the field. Although only one scan chain is illustrated in the embodiment of FIG. 5, multiple scan chains may be included in the host circuit to produce different types of stimulus for purposes of actively triggering hardware trojans in other embodiments.

In one embodiment, the stimulus generated by shifting bits through the flip-flops of the scan chain may generate power supply (Vdd) and/or ground noise that affects operation of the HSIO interface 538, as the test pattern data is applied by the BIST engine. This stimulus may, for example, affect or change the bit-error rate (BER) output from the HSIO interface 538 that may be used as a basis for detecting the presence of a hardware trojan, as described in greater detail below. The control logic 510 may output a detect signal 595 indicating whether or not a hardware trojan was detected.

Figure 6:
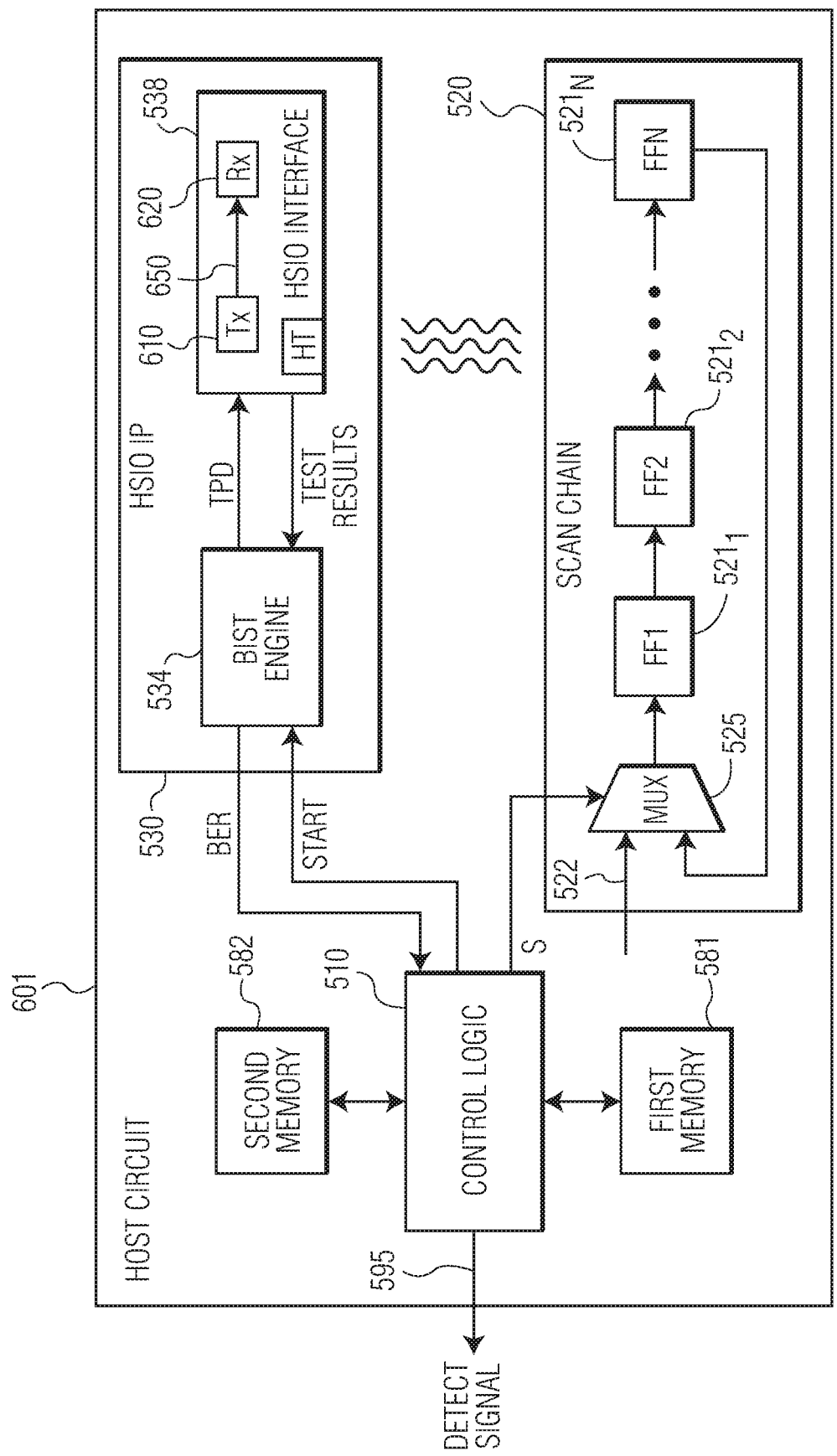
FIG. 6 illustrates an embodiment of a system for triggering and detecting a hardware trojan.

FIG. 6 illustrates another embodiment of a system for triggering and detecting a hardware trojan in a host circuit 601. In at least some respects, this embodiment may be based on the embodiment of FIG. 5 or may be considered to be a more specific implementation of that embodiment. In FIG. 6, the same reference numerals may be used to designate features shared in the embodiment of FIG. 5.

Referring to FIG. 6, the HSIO interface 538 includes a transmitter 610 and a receiver 620. During a normal (or application) mode, the transmitter 610 transmits data through the HSIO IP 530 to a destination outside of the host circuit and the receiver 620 receives data through the HSIO IP 530 from a source outside of the host circuit. In addition to these features, a loop-back signal path 650 may transmit test pattern data (TPD) from the transmitter 610 to the receiver 620 during a test mode, in which BIST engine transfers test pattern data to the HSIO interface 538.

In one embodiment, the transmitter 610 may transmit the test pattern data from the BIST engine to the receiver 620 through the loop-back signal path 650 without a stimulus being applied. Transmission of the test pattern data to the receiver may actively trigger the hardware trojan, e.g., the pattern may be predetermined to trigger one or more specific types of trojans that exhibit certain characteristics when triggered. In this case, the BER (e.g., raw bit-error rate) information may be attributable to the hardware trojan, e.g., an elevated BER may exist as a result of the trojan. In another embodiment, the transmitter 610 may transmit the test pattern data to the receiver 620 while a stimulus is also simultaneously being applied, for purposes of actively triggering the hardware trojan. The BER information may then be processed by the control logic to detect the trojan, as will be described in greater detail below.

In one embodiment, the transmitter 610 may transmit the test pattern of control signals from the BIST engine to the receiver 620 through the loop-back signal path 650 without a stimulus being applied. Transmission of the control signals to the receiver may actively trigger the hardware trojan, e.g., the pattern of transmitted control signals may be predetermined to trigger one or more specific types of trojans that exhibit certain characteristics when triggered. In another embodiment, the transmitter 610 may transmit the pattern of control signals to the receiver 620 while a stimulus is also simultaneously being applied, for purposes of actively triggering the hardware trojan. The BER information may then be processed by the control logic to detect the trojan, as will be described in greater detail below.

Test results from the HSIO 538 are collected by the BIST engine 534 as the stimulus and BIST test pattern data is applied to the HSIO. The BIST engine may convert (or otherwise process) the test results from the HSIO 538 into bit-error rate (BER) information generated during the test. The BER information may be generated, for example, based on comparing the transmitted signal with the received signal. In one embodiment, the BIST engine 534 may pass the test results from the HSIO 538 to the control logic for processing, without performing such conversion.

The control logic 510 may process the BER information received from the BIST engine 534 to detect the presence of a hardware trojan in the HSIO IP 530, and particularly the HSIO 538. In one embodiment, the bit-error rate (BER) may be the raw bit-error rate generated by the HSIO. In one embodiment, the raw bit-error rate may be the bit-error rate generated when error correction logic is switched off in the HSIO IP. Determining the presence of a hardware trojan by processing the raw bit-error rate may lead to a more successful detection result under some circumstances. In other embodiments, the BER may be determined while the error correction logic is switched on.

Hardware Trojan Detection

In detecting hardware trojans that have been actively triggered in accordance with the aforementioned embodiments, the HSIO interface (which includes a hardware trojan) may not operate in a substantially different manner, irrespective of whether the interface is in application mode or BIST mode, with the exception of activation of the loop-back path (if the transmitter and receiver of the HSIO interface is used at least in part to trigger the trojan). This is because, in at least one embodiment, the BIST mode may be implemented in a manner that is as close as possible to the application mode, in order to deliver realistic results of the bit-error rate and for purposes of providing full fault coverage. In another embodiment, the BIST mode and the application mode may be substantially different.

When the hardware trojan is located in the HSIO IP and active, the trojan may reduce the signal quality. This, in turn, leads to a detecting an increase in the bit-error rate, especially when the raw bit-error rate is taken into consideration. (A similar, detectable reduction in signal quality and BER increase may also be produced when the trojan is at other locations). The reduction in signal quality (and commensurate increase in BER) is detectable for various kinds of hardware trojans as discussed herein, but may be especially prominent when the hardware trojan is a type which captures or diverts (e.g., leaks) secret data to an unauthorized entity. The increased bit error rate leads to a higher number of correctable or uncorrectable errors at the receiver side. The increased bit-error rate is also measurable during BIST mode, which is used as a basis for hardware trojan detection.

During the active triggering stage, the control logic may use dedicated measures to purposely increase the raw bit-error rate by a predetermined amount. Some examples of ways in which active triggering may be performed have been previously discussed. These ways may be implemented or accompanied by additional measures, including reducing transmission power, adding jitter at the transmitter or receiver, and setting filters to produce a more pronounced effect of the BER and thus a greater detectability of the hardware trojan. In one embodiment, more than one measure may be used simultaneously to increase the raw bit-error rate.

When these measures are applied and/or the hardware trojan is actively triggered using any of the aforementioned ways (e.g., one or more stimuli, transmission of test pattern data or control signals, etc.), the host circuit may be considered to be in an impeded state. When these measures are not applied (e.g., during application (normal) mode) and/or a hardware trojan is not being actively triggered (e.g., by one or more stimuli, transmission of test pattern data or control signals, etc.), the host circuit may be considered to be in an unimpeded state. Thus, in accordance with one or more embodiments, the bit-error rates in Table 1 may exist during impeded and unimpeded states of the host circuit when a hardware trojan (HT) is and is not active.

TABLE 1

|  | HT Inactive | HT active | HT state unknown |
|---|---|---|---|
| Bit Error rate un-impeded | $BER_{inactive,\ unimpeded}$ | $BER_{active,\ unimpeded}$ | $BER_{unknown,\ unimpeded}$ |
| Bit Error rate impeded | $BER_{inactive,\ impeded}$ | $BER_{active,\ impeded}$ | $BER_{unknown,\ impeded}$ |

In accordance with one or more embodiments, the control logic in the host circuit may process the BER information to detect the presence of a hardware trojan. This may be accomplished as follows. First, before any attempt of actively triggering the hardware trojan, the control logic may measure $BER_{inactive,unimpeded}$ and $BER_{inactive,impeded}$ values during operation of the HSIO interface. This may be performed, for example, during a BIST or other testing or preliminary mode of operation of the host circuit. The $BER_{inactive,unimpeded}$ and $BER_{inactive,impeded}$ values obtained at this time may be indicative of as close to actual conditions of the host circuit as possible during application (or normal) mode. Furthermore, as will become evident below, the $BER_{inactive,unimpeded}$ and $BER_{inactive,impeded}$ values will serve as a reference or benchmark for detecting the presence of a hardware trojan in the host circuit.

The type and/or level of impeding for generating BER values in Table 1 may be different, for example, for different hardware trojans to be detected. In one embodiment, the bit-error rate of the host circuit in an inactive and impeded state may be greater than the bit-error rate of the host circuit in an inactive and unimpeded state. For example, $BER_{inactive,impeded}$ may be a predetermined multiple of $BER_{inactive,unimpeded}$, e.g., $BER_{inactive,impeded} \approx 2*BER_{inactive,unimpeded}$.

When the hardware trojan has been actively triggered, the impediment causing the bit-error rate may mainly come from the payload of the hardware trojan. In this case, applying additional impeding to the HSIO interface or other portions of the host circuit may not substantially add to the BER. Thus, in one embodiment, the following relation may hold when a hardware trojan in the host circuit is active: $BER_{active,impeded}/BER_{active,unimpeded} \ll 2$. Examples of the payload (or the malicious purpose) of hardware trojan include but are not limited to:

Leak secret data, e.g., public/private encryption keys, passwords, etc.

Modify timing or power consumption of the HSIO interface, in order to allow a side-channel attack to read out secret data.

Partially or completely block the function(s) of the host circuit

Partially or completely block the function(s) of the host circuit pending receipt of payment for obtaining a release key ("Ransomware")

Intermittently block the function(s) of the host circuit to disparage a product or brand or to otherwise generate negative media to undermine consumer confidence the product or brand Reduce transmission power, add jitter or noise, provoke sporadic errors Sporadically flip bits or otherwise corrupt a data stream (e.g., in a way which is hard to root cause)

When detecting a hardware trojan in the field, it is not known if a HT exists (and, if it exists, only an active one can be detected). In this case, both $BER_{unknown,unimpeded}$ and $BER_{unknown,impeded}$ are measured in the field. If the ratio is equal to a predetermined number or otherwise falls within a predetermined range (e.g., ~2), the control logic may determine that a hardware trojan in the host circuit has not been triggered. On the other hand, if the ratio is substantially different from this predetermined number or falls outside of the predetermined range (e.g., is ≪2), the control logic may determine that a hardware trojan is active, e.g., has been actively triggered.

Figure 7:
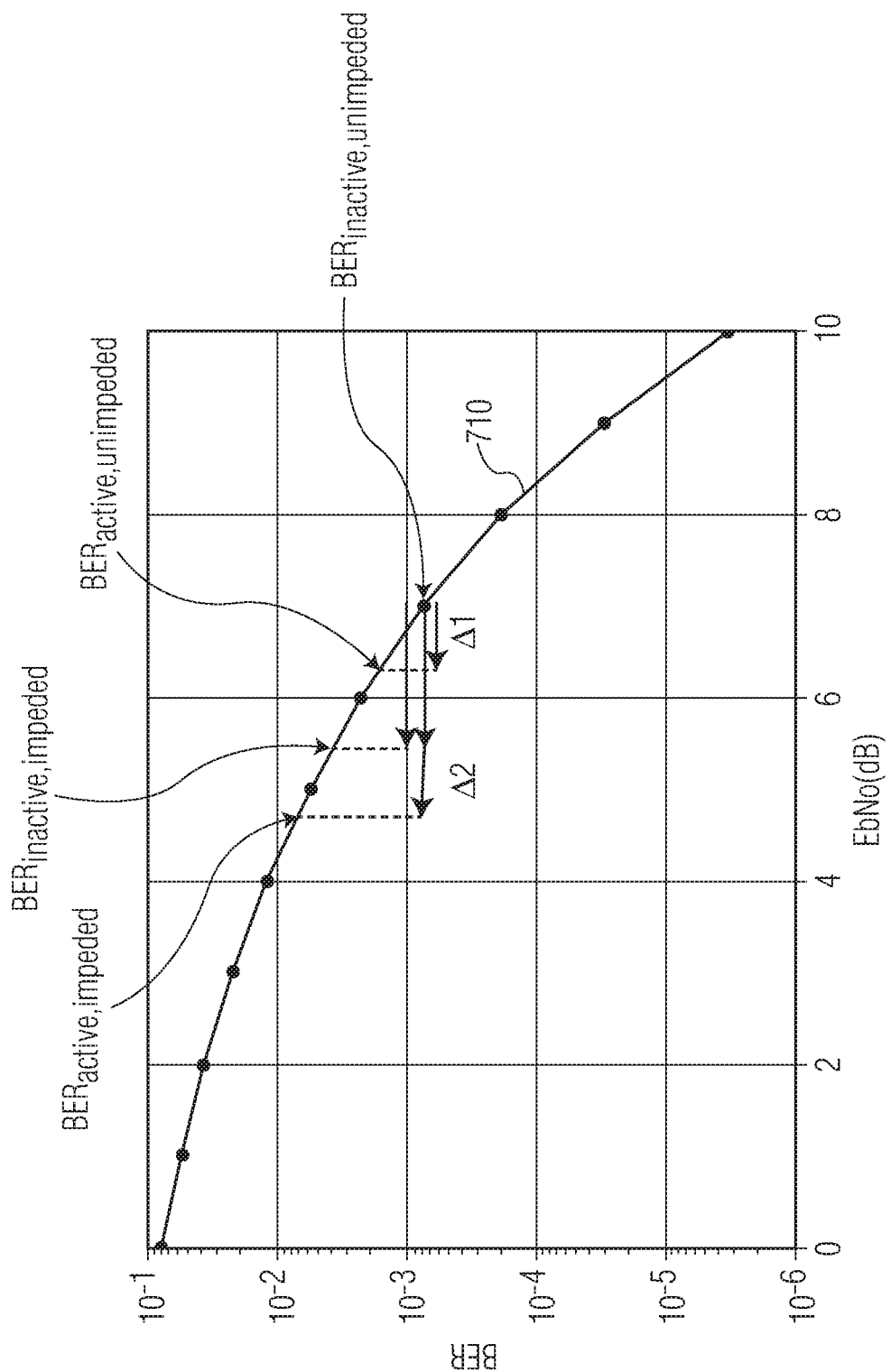
FIG. 7 illustrates an example of a curve to detecting a hardware trojan based on bit-error rate.

FIG. 7 illustrates an example of a curve 710 that may be used by the control logic as a basis for detecting the presence of a hardware trojan in the host circuit. In this example, the curve defines a relationship between the raw bit-error rate BER and signal-to-noise ratio (EbNo) for the host circuit. In one embodiment, the curve is based on BER and EbNo values that were generated (either actually or through simulation) by one or more types of hardware trojans, e.g., the BER and EbNo values may be generated based on past performance data of a hardware trojan in the HSIO interface, either in BIST mode and/or in application mode. Such a curve may therefore be used as a basis for detecting a hardware trojan in the host circuit. In this particular example, the curve was generated when the HSIO interface was performing communications using binary phase shift keying (BPSK) modulation.

As shown by the curve in FIG. 7, an inverse relationship exists between the bit-error rate and the signal-to-noise ratio, e.g., BER increases as the signal-to-noise ratio decreases. Using this curve, the control logic of the host circuit may detect a hardware trojan when the BER increases by a predetermined minimum amount or when the increase falls within a predetermined range. For example, the control logic may determine that a hardware trojan exists in the HSIO interface when the ratio between $BER_{inactive,unimpeded}$ and $BER_{active,unimpeded}$ is equal to or greater than a predetermined ratio $\Delta 1$ (relating to a corresponding discrete point on the curve). The control logic may also determine that a hardware trojan exists in the HSIO interface when the ratio between $BER_{inactive,unimpeded}$ and $BER_{active,impeded}$ is equal to or greater than a predetermined ratio $\Delta 2$ (relating to a corresponding discrete point on the curve). The control logic may also determine that a hardware trojan exists in the HSIO interface when the ratio between $BER_{inactive,impeded}$ and $BER_{active,impeded}$ is equal to or greater than a predetermined ratio $\Delta 3$ (relating to a corresponding discrete point on the curve). The control logic may also determine that a hardware trojan exists in the HSIO interface when the ratio between $BER_{inactive,impeded}$ and $BER_{active,unimpeded}$ is equal to or greater than a predetermined ratio $\Delta 4$ (relating to a corresponding discrete point on the curve).

In another embodiment, the hardware trojan may be detected when the signal-to-noise ratio EbNo falls by a predetermined amount to within a predetermined range while the BER increases by a predetermined amount or falls within a predetermined range. Either of these cases may correspond to discrete points (or a distance between discrete points) on the curve of FIG. 7.

Figure 8A:
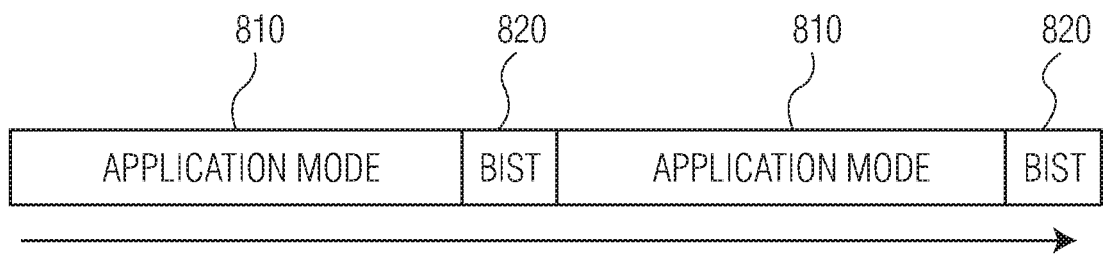
FIG. 8A illustrates an example of a timing diagram for performing a built-in self-test mode and an application mode when trojan detection is not performed.

FIG. 8A illustrates an example of the timing of performing BIST mode 810 and application mode 820 during functional safety testing of a host circuit. As illustrated in FIG. 8A, the relative period of the BIST mode is shorter than the application mode, e.g., is sufficiently short so as to not disturb performance of the host circuit when operating in the application mode. In this example, the BIST mode is performed for the HSIO IP. However, active triggering and hardware detection is not performed during the BIST mode.

Figure 8B:
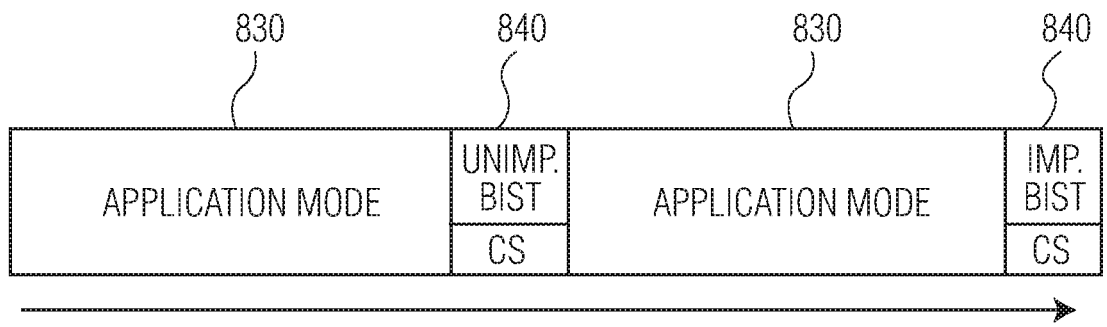
FIG. 8B illustrates an example of a timing diagram for performing a built-in self-test mode and an application mode when trojan detection is performed in accordance with one embodiment.

FIG. 8B illustrates the timing of the application mode 830 and a mode 840 for performing active triggering and detection of a hardware trojan in an HSIO interface, if one exists, according to one or more embodiments. In this case, the mode for triggering and detection the hardware trojan may be performed in parallel with (e.g., the same time as) performance of the BIST functional safety mode for the host circuit. The active triggering may involve any of the methods described herein, including performing a circular scan of the scan chain to generate a stimulus for trojan. The BIST mode itself may be performed either in an impeded or unimpeded state, so that the BER in the impeded and unimpeded states can be compared, for example, to the curve of FIG. 7 for detecting the trojan. In the embodiment of FIG. 8B, the BIST mode is performed with alternating active triggering and detection of hardware trojans in unimpeded and impeded states.

Figure 9:
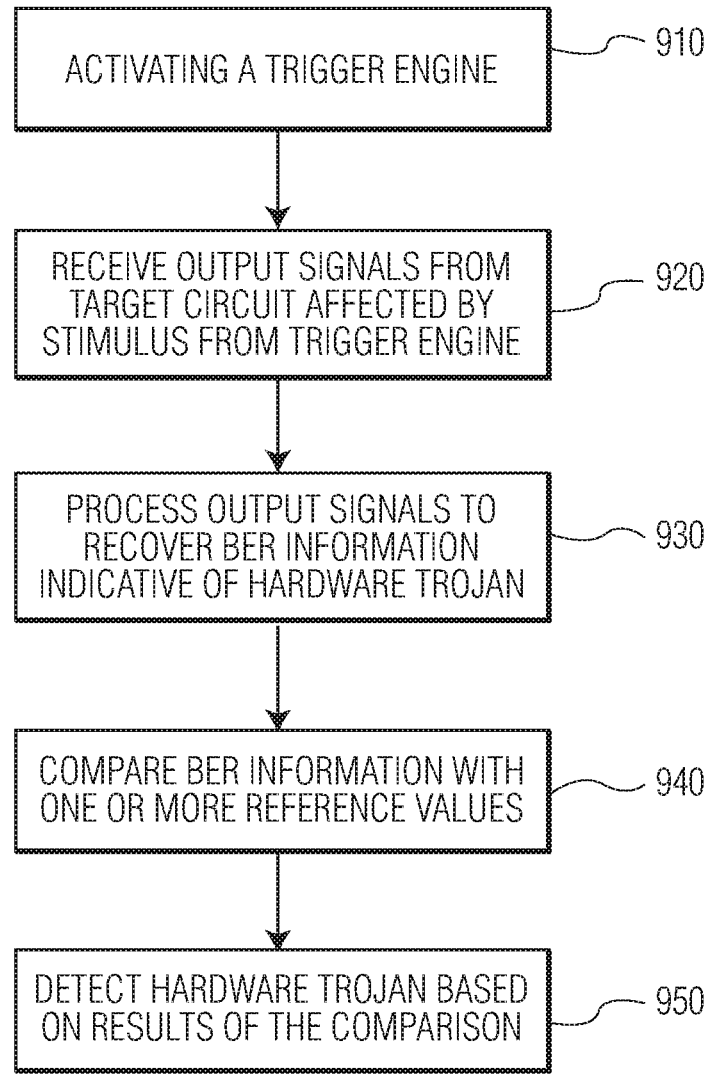
FIG. 9 illustrates an embodiment of a method for triggering and detecting a hardware trojan.

FIG. 9 illustrates an embodiment of a method for actively triggering and detecting a hardware trojan in a host circuit. The method may be performed, for example, by any of the system and other embodiments described herein. At 910, the method includes activating a trigger engine for a host circuit that includes at least one target circuit. The trigger circuit may include any type of circuit that generates a stimulus for actively triggering operation of a hardware trojan on the host circuit. For example, the trigger circuit may include the scan chain as previously described and/or another type of trigger circuit. The stimulus may be, for example, noise, jitter, or other forms of electromagnetic energy. The stimulus may also include the transmission of certain signature patterns of data and/or control signals through the target circuit, when, for example, the target circuit includes an interface, such as an HSIO interface. In one embodiment, the trigger engine includes logic that generates a stimulus for actively triggering the hardware trojan using a dedicated patter or sequence of patterns of transmitted data and/or a dedicated pattern or sequence of patterns of control signals. In one embodiment, the trigger engine may include the BIST engine.

At 920, output signals generated by the target circuit are received, for example, by control logic in the host circuit. The output signals are generated at the same time the stimulus is applied to the target circuit, and thus include information that may be processed that can provide a basis for detecting the hardware trojan, if there is one. The hardware trojan may be included in the target circuit or, for example, may be outside of the target circuit but in the same host circuit.

At 930, the output signals are processed by the control logic to recover a predetermined type of information indicative of the presence of a hardware trojan. When the target circuit includes an HSIO interface, the output signals may be processed to recover bit-error rate information from the output signals of the target circuit. The bit-error rate information may include raw bit-error rates or bit-error rates obtained even when error correction techniques are applied, although the former case may be more effective for purposes of detecting a hardware trojan in some cases. In another embodiment, the output signals may be processed to recover a different type of information for purposes of detecting the trojan, when the target circuit includes an HSIO interface or is a different type of circuit.

At 940, the bit-error rate information may be compared to one or more reference values, for example, in order to determine whether there has been an increase in the bit-error rate. In one embodiment, the bit-error rate and one or more references values may correspond to rates and values obtained in a predetermined mode of operation of the host circuit. The predetermined mode of operation may be a BIST mode or another mode. The reference value(s) may be, for example, one or more BER values generated at a time when the hardware trojan is not activated, or one or more of the other types of BER information set forth in Table 1. In one embodiment, the comparison may be performed with reference to a curve, such as but not limited to the one set forth in FIG. 7.

At 950, the presence or absence of a hardware trojan in the host circuit (or even in the target circuit) may be determined based on results of the comparison. For example, when the comparison performed in operation 940 indicates that the BER has increased by a predetermined amount or lies within a predetermined range, then control logic may output a detect signal indicating that a hardware trojan has been detected.

In accordance with another embodiment, a non-transitory computer-readable medium may store instructions for causing a processor to perform the operations of the system and method embodiments described herein. The processor may be located in the host circuit or on-chip and may, for example, perform the operations of the control logic or the BIST engine, or both. The instructions may be stored, for example, in at least one of the first or second memories, for example, as illustrated in FIG. 2, 3, 5, or 6. The computer-readable medium may be any of a variety of memory types including but not limited to read-only memory (ROM), random-access memory (RAM), magnetic disk storage media, optical storage media, flash-memory devices, and similar storage media.

The control logic, engines, processors, units, interfaces, and other signal generating, processing, and calculating features of the embodiments disclosed herein may be implemented in logic which, for example, may include hardware, software, or both. When implemented at least partially in hardware, the control logic, engines, processors, units, interface, and other information generating, processing, or calculating features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the control logic, engines, processors, units, interfaces, and other information generating, processing, or calculating features may include, for example, a memory or other storage device for storing code or instructions to be executed, for example, by a computer, processor, microprocessor, controller, or other signal processing device. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. A detector, comprising:
a memory configured to store instructions; and
control logic configured to execute the instructions to activate a trigger engine that includes a scan chain of flip-flops and detect a hardware trojan based on output signals of a target circuit, wherein the scan chain of the trigger engine is configured to generate a stimulus that includes a wireless emission of electromagnetic energy carrying a signature for triggering activation of the hardware trojan, the wireless emission excluding the output signals of the target circuit and generated by shifting bit values through the scan chain of flip flops arranged in a circular scan pattern to activate the hardware trojan, and wherein the output signals of the target circuit are generated when the stimulus is applied.

2. The detector of claim 1, wherein the control logic is further configured to shift the bit values through the scan chain of flip flops arranged in the circular scan pattern a predetermined number of cycles to generate the stimulus.

3. The detector of claim 1, wherein the target circuit includes a high-speed input/output (HSIO) interface which includes the hardware trojan.

4. The detector of claim 3, wherein the control logic is configured to activate the trigger engine during a built-in self-test (BIST) of the HSIO interface and process the output signals of the target circuit to detect the hardware trojan in the HSIO interface during the BIST.

5. The detector of claim 1, wherein the control logic is configured to detect the hardware trojan based on bit-error rate information corresponding to the output signals of the target circuit.

6. The detector of claim 5, wherein the control logic is configured to detect the hardware trojan based on a difference between a first bit-error rate and a second bit-error rate, the first bit-error rate generated when the stimulus is not applied to the target circuit by the trigger engine and the second bit-error rate generated when the stimulus is applied to the target circuit by the trigger engine.

7. The detector of claim 1, wherein the hardware trojan is a type which is configured to perform at least one of the following:
send secret data to an unauthorized entity, disrupt operation of the target circuit or its host circuit;
destroy operation of the target circuit or its host circuit;
corrupt data of a data stream managed by the target circuit or its host circuit; and
impair the target circuit or its host circuit on an intermittent basis.

8. The detector of claim 1, wherein the control logic is configured to control generation of the stimulus based on a dedicated pattern or sequence of patterns of transmitted data or a dedicated pattern or sequence of patterns of control signals.

9. A method for managing operation of a circuit, comprising:
activating a trigger engine that includes a scan chain of flip-flops;
receiving signals from a target circuit; and
detecting a hardware trojan based on the signals,
wherein the scan chain of the trigger engine generates a stimulus that includes a wireless emission of electromagnetic energy carrying a signature for triggering activation of the hardware trojan, the wireless emission excluding the received signals from the target circuit and generated by shifting bit values through the scan chain of flip flops arranged in a circular scan pattern to activate the hardware trojan, and wherein the target circuit generates the received signals when the stimulus is generated.

10. The method of claim 9, wherein the circular scan includes shifting the bit values through the flip-flops for a predetermined number of cycles to generate the stimulus.

11. The method of claim 9, wherein the target circuit includes a high-speed input/output (HSIO) interface which includes the hardware trojan.

12. The method of claim 11, wherein the trigger engine is activated during a built-in self-test (BIST) of the HSIO interface and wherein detecting the hardware trojan in the HSIO interface includes processing the signals from the target circuit during the BIST.

13. The method of claim 9, further comprising:
determining bit-error rate information based on the signals from the target circuit, wherein the hardware trojan is detected based on bit-error rate information.

14. The method of claim 13, further comprising:
determining a difference between a first bit-error rate and a second bit-error rate, wherein the first bit-error rate is generated when the stimulus is not applied to the target circuit by the trigger engine and the second bit-error rate is generated when the stimulus is applied to the target circuit by the trigger engine and wherein the hardware trojan is detected based on the difference between the first bit-error rate and the second bit-error rate.

15. The method of claim 9, wherein the hardware trojan is a type which is configured to perform at least one of the following:
send secret data to an unauthorized entity,
disrupt operation of the target circuit or its host circuit;
destroy operation of the target circuit or its host circuit;
corrupt data of a data stream managed by the target circuit or its host circuit; and
impair the target circuit or its host circuit on an intermittent basis.

16. A non-transitory computer-readable medium storing instructions for causing a processor to perform operations including:
activating a trigger engine that includes a scan chain of flip-flops to generate a stimulus that includes a wireless emission of electromagnetic energy carrying a signature for triggering activation of a hardware trojan, the wireless emission generated by shifting bit values through the scan chain of flip flops arranged in a circular scan pattern;
receiving signals from a target circuit when the stimulus is applied; and detecting the hardware trojan based on the signals from the target circuit,
wherein the wireless emission corresponding to the stimulus excludes the received signals from the target circuit and is to activate the hardware trojan and the target circuit is to generate the received signals when the stimulus is generated, the target circuit including a high-speed input/output (HSIO) interface, and the hardware trojan is detected based on bit-error rate information corresponding to the signals from the target circuit.

* * * * *